(12) United States Patent
Funazaki et al.

(10) Patent No.: US 6,700,703 B2
(45) Date of Patent: Mar. 2, 2004

(54) TRANSMISSION TYPE SCREEN

(75) Inventors: Kazuo Funazaki, Nakajo-machi (JP); Katsuhiro Fujita, Nakajo-machi (JP); Osamu Shinji, Nakajo-machi (JP)

(73) Assignee: Kuraray Co., Ltd., Okayama (JP)

( * ) Notice: Subject to any disclaimer, the term of this patent is extended or adjusted under 35 U.S.C. 154(b) by 127 days.

(21) Appl. No.: 10/080,579

(22) Filed: Feb. 25, 2002

(65) Prior Publication Data
US 2002/0163721 A1 Nov. 7, 2002

(30) Foreign Application Priority Data
Feb. 27, 2001 (JP) ........................................ 2001-051342

(51) Int. Cl.[7] .............................................. G03B 21/60
(52) U.S. Cl. ...................................................... 359/457
(58) Field of Search ................................. 359/455, 456, 359/457

(56) References Cited

U.S. PATENT DOCUMENTS 5,581,407 A * 12/1996 Mitani et al. ................ 359/457
6,469,830 B1 * 10/2002 Dubin et al. ................. 359/457
6,519,087 B2 * 2/2003 Moshrefzadeh ............. 359/453

* cited by examiner

*Primary Examiner*—Christopher Mahoney
(74) *Attorney, Agent, or Firm*—Oblon, Spivak, McClelland, Maier & Neustadt, P.C.

(57) ABSTRACT

A transmission type screen is disclosed. The transmission type screen comprises a Fresnel lens sheet, a lenticular lens sheet provided with convex black stripes on the light-exit surface, and a diffusion sheet having an uneven surface on one side thereof. In the transmission type screen, the uneven surface of the diffusion sheet is joined to the lenticular lens sheet at the top portions of black stripes.

9 Claims, 8 Drawing Sheets

TRANSMISSION TYPE SCREEN

BACKGROUND OF THE INVENTION

1. Field of the Invention

The present invention relates to a transmission type screen for rear projection type image display devices in which an image from a projection device is projected from the rear surface of the screen, more specifically, to a transmission type screen suitable for rear projection type image display devices provided with a projection device of a single-lens system using an image panel having a plurality of pixels, such as liquid-crystal panels and digital micromirror devices (referred to as DMD hereinbelow).

2. Description of the Related Art

CRTs of a red (R), green (G), and blue (B) three-tube system that feature the possibility of obtaining a high brightness have been usually used as image projectors in rear projection type display devices. Transmission type screens used in combination with the three-tube CRTs are composed of a lenticular lens sheet and a Fresnel lens sheet. In a lenticular lens sheet 11, as shown schematically in FIG. 7, black stripes 13 are formed in positions different from a converging position of a light beam incident from lenses 12 located on the light incidence side. Herein, the lens pitch in the lenticular lens sheet was usually no less than 0.5 mm and the sheet thickness was usually no less than 0.6 mm in order to obtain a sufficient contrast, a wide-range view angle and also a high mechanical strength.

However, CRTs of a red (R), green (G), and blue (B) three-tube system were difficult to make compact and lightweight, while maintaining a sufficient brightness. Accordingly, in recent years, rear projection type image display devices have been developed in which the weight and size of projection devices were decreased by using a liquid-crystal panel, DMD, and the like as the projection devices. Liquid-crystal panels or DMD have a large number of pixels, and when such projection devices were used in combination with screens that have been used in the conventional three-tube CRT projection devices, because both the pixels of the liquid-crystal panel, DMD, and the like and the lenses of the lenticular lens sheet have a periodic structure in the horizontal direction, a problem was associated with the appearance of moiré formed by the pixels and lenticular lenses.

A known technology (see Japanese Patent Application Laid-open No. H02-97991) avoids the appearance of such moiré by employing the ratio of the lenticular lens pitch to the horizontal pitch of pixel images projected on the screen of 1/(N+½) (N is integer of no less than 1). Usually, an N value of no less than 2 is used. For example, if the pitch of pixel images projected on the screen is assumed to be 1.0 mm, the pitch of lenticular lenses satisfying the above-mentioned condition will be as small as 0.4 mm when N is 2, 0.28 mm when N is 3, and 0.222 mm when N is 4. In recent years the pitch of lenticular lenses set according to such technology tended to decrease because resolution of screens was increasing and the pitch of pixel images was decreasing.

The conventional lenticular lens sheets have been optically designed so that a light beam incident on the lens on the light incidence side was focused in a point outside the lens on the exit side, as shown in FIG. 8 (see Japanese Patent Application Laid-open S58-221833). In the lenticular lens sheet thus designed, the ratio Lt/LP1 of the maximum distance from the lens surface on the light incidence side of a lenticular lens sheet to the exit surface (Lt, referred to as "the thickness of a lenticular lens sheet" hereinbelow) to the pitch of lenticular lenses (LP1) is typically within a range of 1.1~1.25 to guarantee the desired characteristics of the screen in the horizontal direction. For example, when the pitch of lenticular lenses is 0.72 mm, the thickness of the lenticular lens sheet is 0.87 mm. With the thickness of the lenticular lens sheet of such order, the mechanical strength is sufficient and the sheet can be easily manufactured. On the other hand, in order to eliminate moiré in accordance with the invention disclosed in Japanese Patent Application Laid-open No. H02-97991, if the pitch of lenticular lenses is 0.22 mm, the thickness of a lenticular lens sheet becomes as small as 0.242~0.275 mm. The lenticular lens sheets are usually fabricated by using optically transparent thermosetting resins. If the thickness of a lenticular lens sheet is as small as 0.242~0.275 mm, the sheet is difficult to manufacture and the mechanical strength thereof is low.

Accordingly, if the thickness (Lt) of a lenticular lens sheet is no less than 0.3 mm and the pitch (LP1) of lenticular lenses is 0.22 mm in order to facilitate the manufacture and to obtain a sufficient mechanical strength, the ratio Lt/LP1 thereof will be no less than 1.36. For example, when the pitch of lenticular lenses is 0.22 mm and the thickness of a lenticular lens sheet is 0.87 mm, if the shape of the lens 3 on the light incidence side is determined so as to obtain a sufficient horizontal diffusion characteristic, the light beam is sometimes shielded by the surface of black stripes 2, as shown in FIG. 9, and the loss of quantity of light sometimes becomes too large.

On the other hand, if the shape of lenses 3 on the light incidence side is designed so that the light beam is shielded by the surface of black stripes 2, then, as shown in FIG. 10, it becomes necessary to almost match the focal distance of lenses 3 on the light incidence side with the sheet thickness and a sufficient horizontal diffusion characteristic cannot be obtained.

As described above, the problem associated with the prior art technology was in that it was difficult to obtain a lenticular lens sheet with a small pitch which was easy to manufacture and which had a high mechanical strength and also demonstrated a high diffusion performance.

SUMMARY OF THE INVENTION

In view of the foregoing, it is an object of the present invention to provide a transmission type screen which makes it possible to obtain an excellent horizontal diffusion characteristic, to eliminate moiré, and to increase contrast.

According to one aspect of the present invention, for achieving the above-mentioned object, there is provided a transmission type screen comprising a Fresnel lens sheet, a lenticular lens sheet provided with convex black stripes on the light-exit surface, and a diffusion sheet having an uneven surface on one side thereof, wherein the uneven surface of the diffusion sheet is joined to the lenticular lens sheet at the top portions of black stripes.

Consequently, it is possible to obtain an excellent horizontal diffusion characteristic, to eliminate moiré, and to increase contrast.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
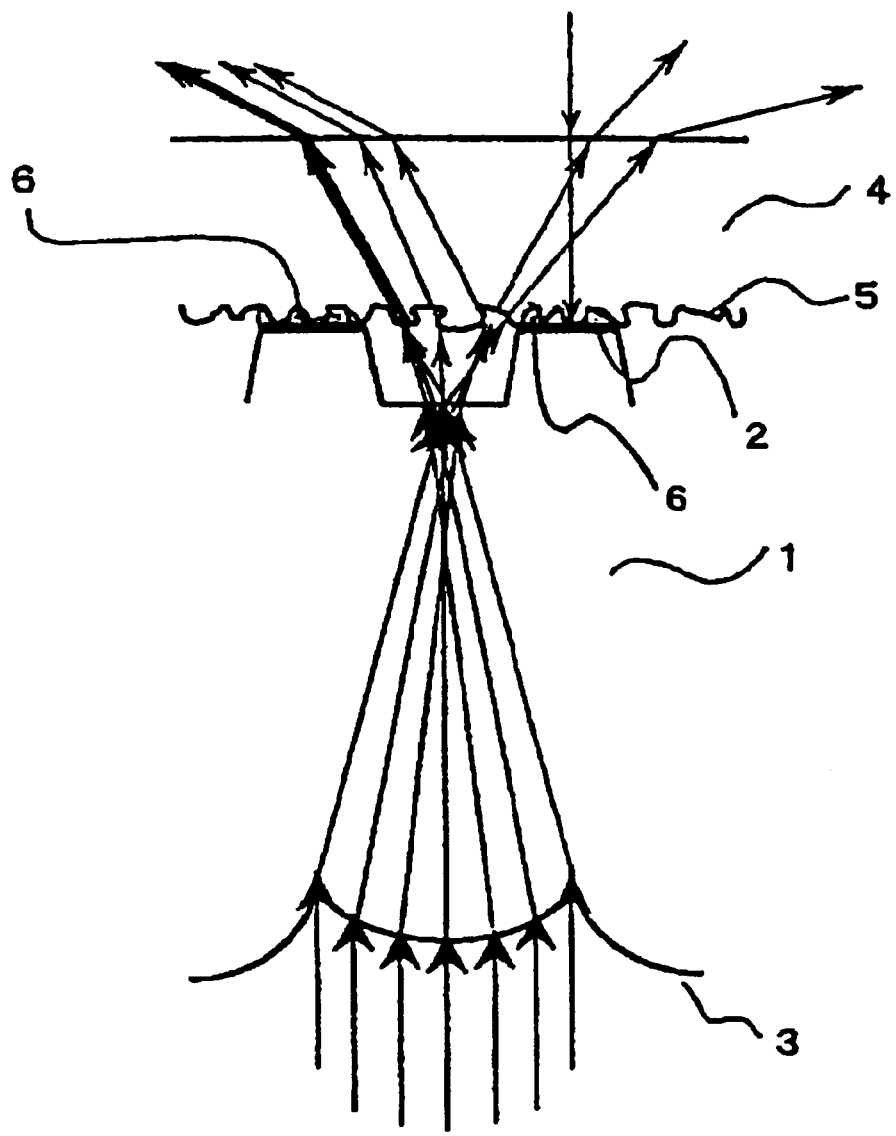
FIG. 1 shows a structure of the transmission type screen according to the present invention.

A schematic structure of the transmission type screen in accordance with the present invention which resolves the above-described problems is shown in FIG. 1. The transmission type screen in accordance with the present invention comprises a Fresnel lens sheet (not shown in the figures), a lenticular lens sheet 1 provided with convex black stripes 2 on the light-exit surface thereof, and a diffusion sheet 4 having an uneven surface 5 on one side thereof, wherein the uneven surface 5 of the diffusion sheet 4 and the lenticular lens sheet are joined at the top portions of black stripes 2.

Figure 2:
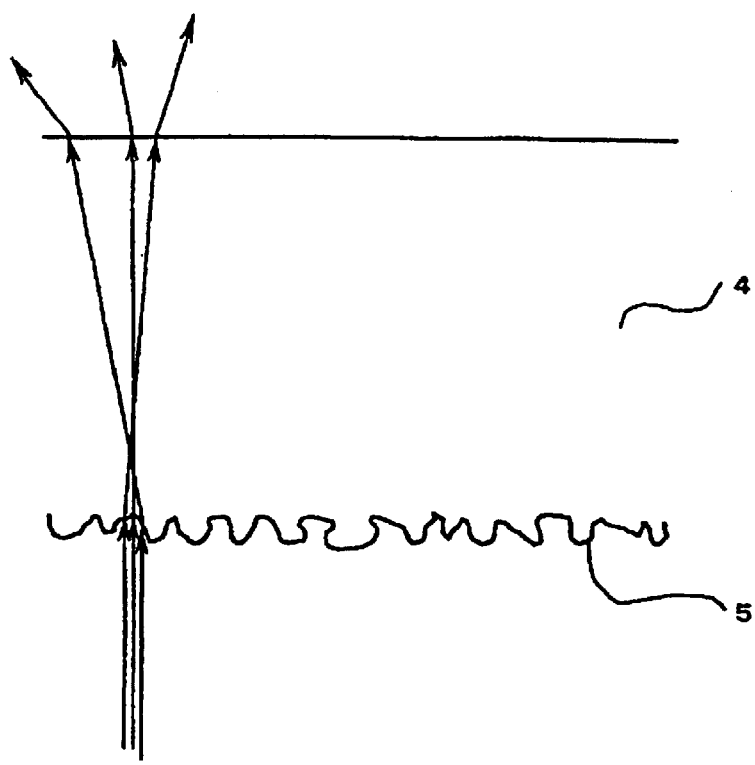
FIG. 2 shows a light path when the light beam falls on the diffusion sheet having an uneven surface on one side thereof from the uneven surface.
Figure 3:
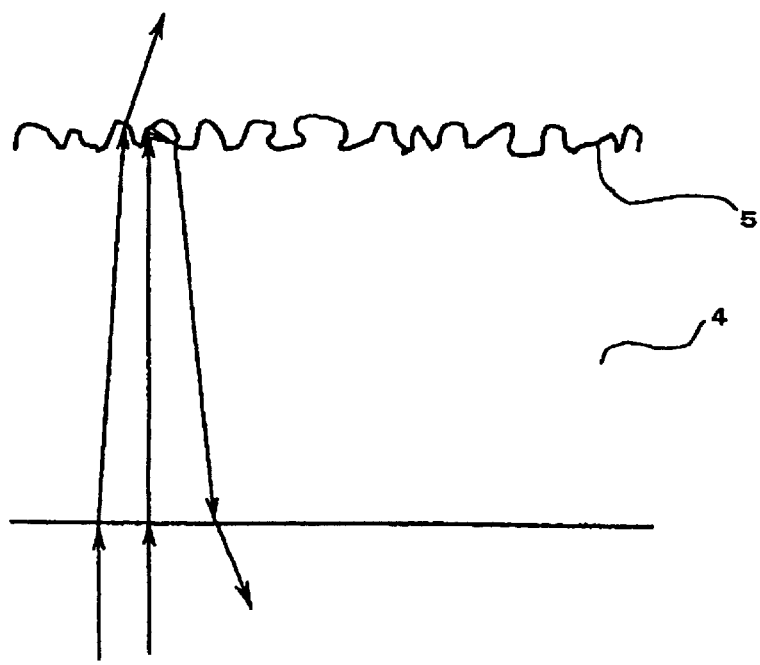
FIG. 3 shows a light path when the light beam is incident from the surface opposite to the uneven surface of the diffusion sheet.
Figure 4:
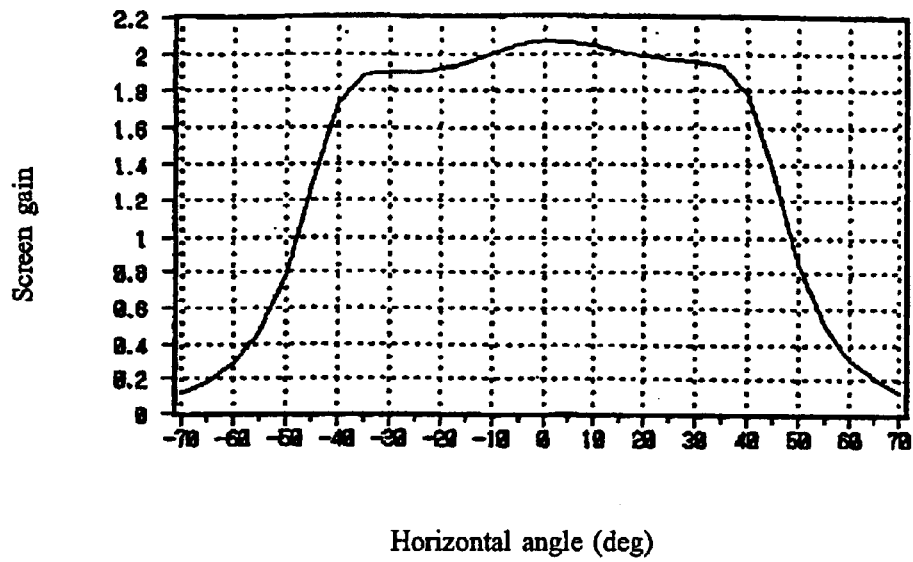
FIG. 4 is a graph showing a horizontal diffusion characteristic when the light beam falls on the diffusion sheet having an uneven surface on one side thereof from the uneven surface.
Figure 5:
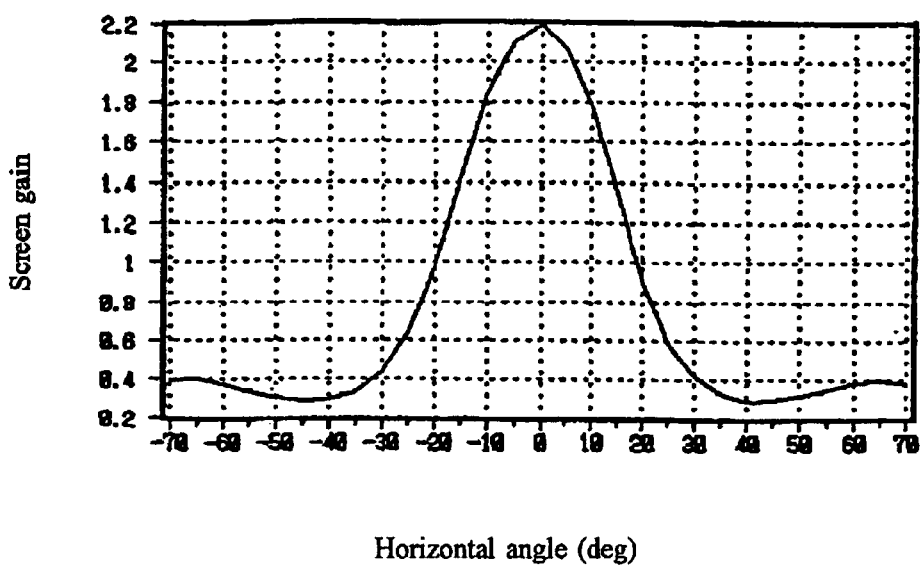
FIG. 5 is a graph showing a horizontal diffusion characteristic when the light beam is incident from the surface opposite to the uneven surface of the diffusion sheet.

When a light beam falls on the diffusion sheet 4 having an uneven surface on one side thereof from the uneven surface 5, because the light-exit surface is flat, the uneven surface 5 does not hinder the transmission of light and a sufficient full-light transmissivity can be obtained, as shown in FIG. 2. On the other hand, when a light beam is incident from the surface opposite to the uneven surface 5, since the light-exit surface has peaks and valleys, the light beam is recurrently reflected, as shown in FIG. 3, light transmission is hindered, and a full-light transmissivity is greatly reduced. An example of the horizontal diffusion characteristic obtained when a light beam was incident from the uneven surface side of a diffusion sheet is shown in FIG. 4. An example of the horizontal diffusion characteristic obtained when a light beam was incident from the side having no uneven surface is shown in FIG. 5. Those graphs demonstrate that the incidence of a light beam from the uneven surface side is preferred in terms of horizontal diffusion performance (in FIG. 4 and FIG. 5, a horizontal angle (deg) is plotted against the abscissa and a screen gain is plotted against the ordinate).

Figure 6:
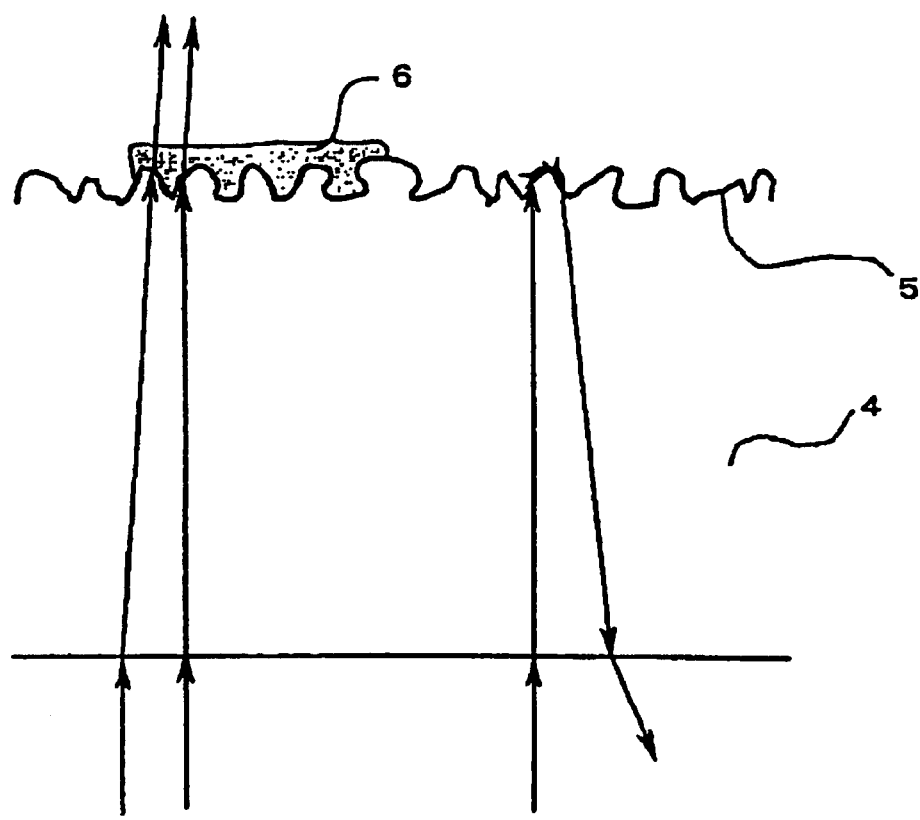
FIG. 6 shows an effect which the recurrent reflection of the external light does not occur when the uneven surface is covered with a part having a refractive index almost equal to that of the diffusion sheet.
Figure 7:
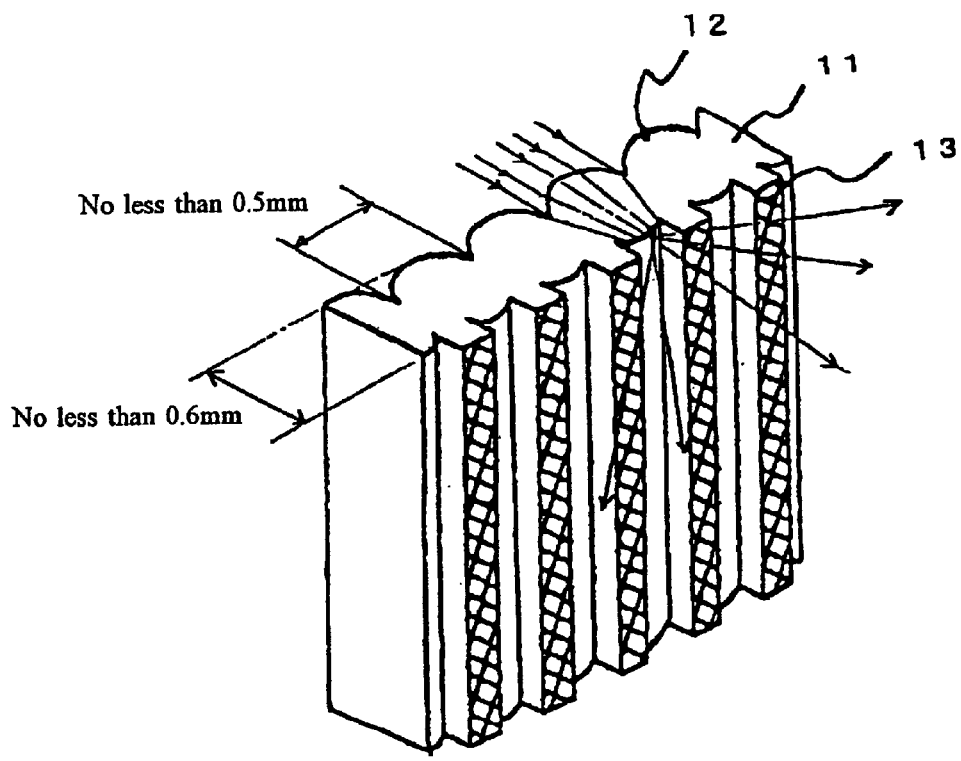
FIG. 7 is a schematic diagram showing one example of the conventional lenticular lens sheet.
Figure 8:
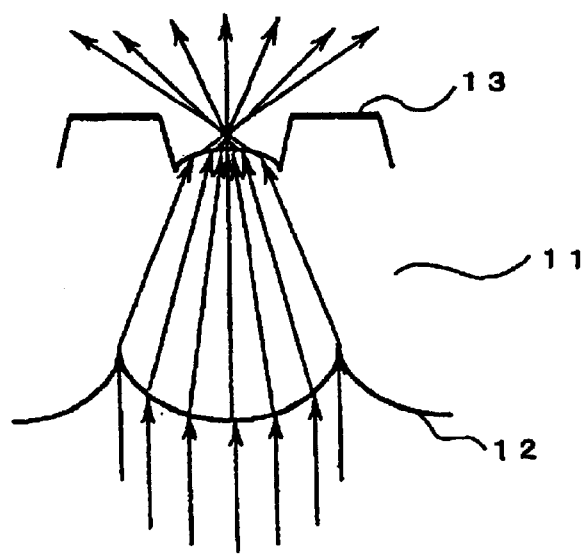
FIG. 8 shows a sectional view of one example of the conventional lenticular lens sheet.
Figure 9:
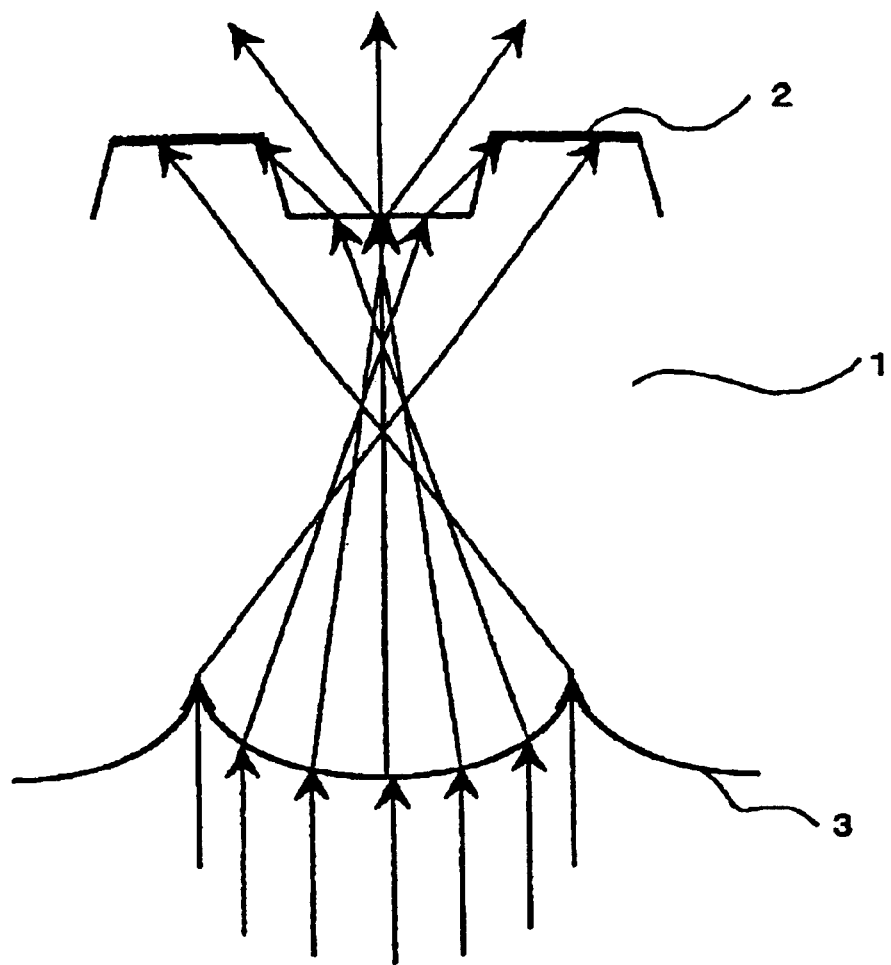
FIG. 9 shows a sectional view of the conventional lenticular lens sheet in which the light beam is shielded by the black stripes.
Figure 10:
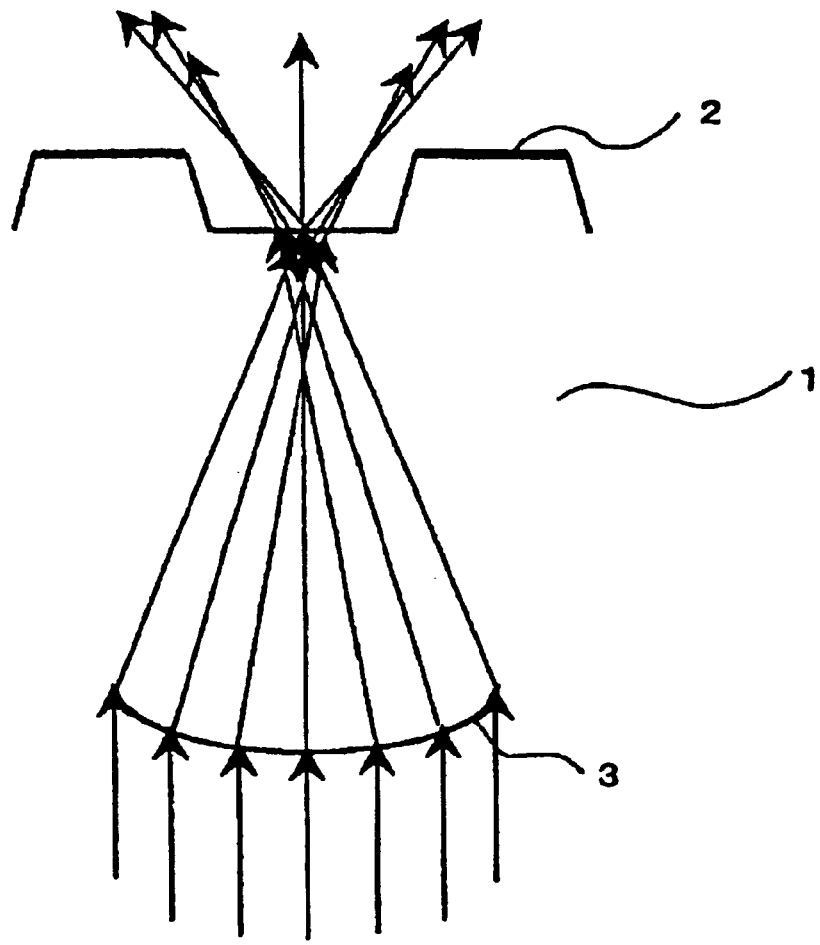
FIG. 10 shows a sectional view of the conventional lenticular lens sheet which does not have a sufficient horizontal diffusion characteristic.

As described above, in a diffusion sheet having an uneven surface on one side thereof, it is preferred, from the standpoint of horizontal diffusion performance and full-light transmissivity, that a light beam be falling from the uneven surface side. However, when an external light falls upon the diffusion sheet (that is, in case when the light beam shown in FIG. 3 is the external light), the external light is recurrently reflected and contrast performance is lost to a large degree. By contrast, when the uneven surface is covered with a part 6 having a refractive index almost equal to that of the diffusion sheet, as shown in FIG. 6, the recurrent reflection of the external light does not occur and contrast performance is improved.

In the transmission type screen in accordance with the present invention, the uneven surface 5 of the diffusion sheet 4 and the lenticular lens sheet 1 are joined at the top portions of black stripes 2 and no air layer is present between the uneven surface 5 of the diffusion sheet 4 and the top portions of black stripes 2. Therefore, no problem is associated with contrast decrease caused by recurrent reflection of external light. The uneven surface 5 of the diffusion sheet 4 and the top portions of black stripes 2 may be joined via a part 6 having a refractive index almost equal to that of the diffusion sheet that was selected so as to match the material of the diffusion sheet in order to prevent recurrent reflections. An adhesive can be used as the part 6 having a refractive index almost equal to that of the diffusion sheet and joining can be conducted by adhesive bonding. Furthermore, joining may be also conducted, for example, by melting and press bonding so that the uneven surface 5 of the diffusion sheet 4 becomes flat in the joint with the top portions of black stripes 2.

In the transmission type screen in accordance with the present invention, a diffusion sheet in which Tt1 and Tt2 satisfy the relationship $0.6 < Tt2/Tt1 < 0.98$, where Tt1 (%) is a full-light transmissivity at the time when a light beam is incident onto a diffusion sheet from the uneven surface and Tt2 (%) is a full-light transmissivity at the time when a light beam is incident from the surface opposite to the uneven surface, has a sufficient diffusion characteristic and a higher contrast can be obtained. Further, a diffusion sheet in which Tt1 and Tt2 satisfy the relationship $0.65 < Tt2/Tt1 < 0.85$ is preferable. Furthermore, more preferable range of the Tt2/Tt1 is from 0.7 to 0.8. When in the above-described lenticular lens sheet the pitch of lenticular lenses on the light incidence side which are arranged equidistantly in the horizontal direction is less than 0.5 mm, the appearance of moiré between the pixels of a liquid-crystal panel, DMD, or the like and the lenticular lenses can be effectively avoided. When the thickness of the lenticular lens sheet is more than 0.3 mm, a higher mechanical strength can be obtained.

Furthermore, when the thickness of a lenticular lens sheet is denoted by Lt (mm) and the focal distance of lenses on the light incidence side of the lenticular lens sheet is denoted by Lf (mm), if Lt and Lf satisfy the relationship 0.8<Lf/Lt<1.2, the effect of shielding the image light beam on the light exit side of the lenticular lens sheet by the black stripes can hardly occur and a sufficient quantity of light can be obtained.

Furthermore, subjecting the diffusion sheet to coloration treatment makes it possible to obtain excellent contrast by light absorption. Coloration as referred to herein means a function of attenuating the amount of transmitted light according to the transmission distance. The coloration treatment is preferably conducted only on the uneven surface. When the coloration treatment is conducted only on the uneven surface, the share of transmission distance increment caused by recurrent reflection in the transmission distance in the coloration zone is increased by comparison with that obtained when the entire diffusion sheet is subjected to coloration and the light beam returning to a viewer side because of recurrent reflection can be attenuated, thereby making it possible to increase the contrast with higher efficiency. Furthermore, when the diffusion sheet has a non-isotropy, external light reflection brightness can be reduced.

A detailed description will now be given of a method of manufacturing the lenticular lens sheet and transmission type screen according to the present invention with reference to FIG. 11.

Figure 11:
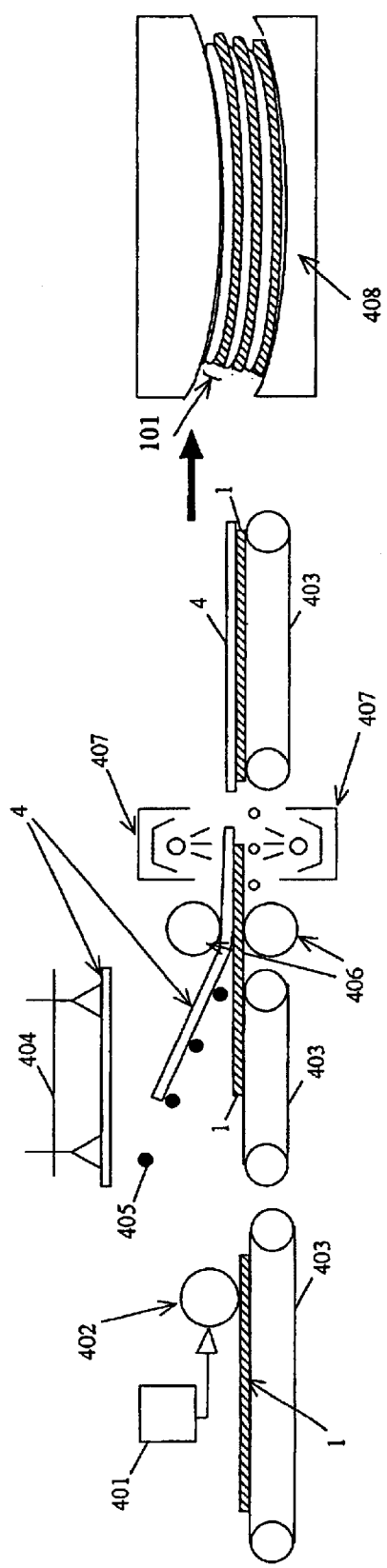
FIG. 11 shows one example of a method of manufacturing the lenticular lens sheet and transmission type screen according to the present invention.

Firstly, the lenticular lens sheet 1 is placed on conveyance means 403 composed of conveying rollers, a conveyor belt or the like, and is conveyed to the right in FIG. 11. During the conveyance, an ultraviolet ray curing type adhesive is applied by an adhesive applying roller 402 onto the summit portions of the projecting non-convergence parts provided on the light-exiting surface side of the lenticular lens sheet 1. The adhesive is supplied from adhesive supply means 401, with the supply being controlled such that a predetermined amount of adhesive is applied onto the summit portion of each non-convergence part, centered on the central part of the summit portion.

Next, the diffusion sheet 4, which is held by diffusion sheet holding means 404, is conveyed by conveying rollers 405 so as to come down onto the lenticular lens sheet 1 just before bonding nip rollers 406. The lenticular lens sheet 1 and the diffusion sheet 4, which are now on top of one another, are then conveyed between the bonding nip rollers 406. The lenticular lens sheet 1 and the diffusion sheet 4 passing between the bonding nip rollers 406 are further conveyed to the right in FIG. 11 due to the rotation of the bonding nip rollers 406. The positions of the upper and lower bonding nip rollers 406 are fixed, and hence the bonding nip rollers 406 apply a fixed pressure to the lenticular lens sheet 1 and the diffusion sheet 4 sandwiched therebetween. As a result, the lenticular lens sheet 1 and the diffusion sheet 4 are bonded together through the adhesive. If the amount of adhesive applied is controlled and the pressure applied by the nip rollers during the bonding is adjusted so as not to be excessively large, then the adhesion width can be controlled so as not to exceed a certain range. As a result, patches arising through the bonding can be prevented. Moreover, because black stripes, i.e. external light absorbing layers, are formed in advance, the occurrence of places where the light blocking effect is low due to the adhesive layer being too thin can be suppressed.

After passing between the bonding nip rollers 406, the lenticular lens sheet 1 and the diffusion sheet 4 are irradiated with ultraviolet rays by an ultraviolet ray irradiation device 407. This irradiation with ultraviolet rays cures the adhesive, thus permanently bonding the lenticular lens sheet 1 and the diffusion sheet 4 together. Note, however, that 'permanently bonding' here does not mean that there is absolutely no chance whatsoever of the lenticular lens sheet 1 and the diffusion sheet 4 peeling away from one another.

The bonded article comprising the lenticular lens sheet 1 and the diffusion sheet 4 is then subjected to a curvature-applying operation. In the curvature-applying operation, firstly a plurality of bonded articles 101 each comprising a lenticular lens sheet 1 and a diffusion sheet 4 are piled on top of one another and are placed onto a curving mold 408, with the diffusion sheet 4 of each bonded article 101 being at the top as shown in FIG. 11. The bonded articles 101 are then left for 1 hour in an oven at a temperature close to the thermal deformation temperature of the lenticular lens sheet 1 and the diffusion sheet 4, for example 60 to 100° C., thus completing the curvature-applying operation. Note that it is also possible to place only one bonded article 101 as opposed to a plurality of bonded articles 101 on the curving mold 408.

EMBODIMENTS

The present invention will be described below in greater details based on embodiments thereof. In the embodiments, the contrast was evaluated by measuring the external light reflection brightness. Measurements of the external light reflection brightness were conducted by measuring the brightness of a black portion in a state in which a projection television screen was illuminated with a dimmed light of a halogen lamp at an angle of about 45° from above the screen so that the illumination intensity of the screen surface was 360 Lx. With such a measurement method, the lower is the brightness, the higher is the contrast performance. A calorimeter Chroma Meter CS-100 manufactured by Minolta Co., Ltd. was used to measure the brightness.

Moiré observations were conducted in the following manner. A projection device used for the observations was provided with a liquid-crystal projector and had a 55-inch screen. The observations were conducted within ranges of 0°~45° above the screen and −45°~45° in the horizontal direction in a position at a distance of about 1.5 m from the screen.

Embodiment 1

In Embodiment 1, a lenticular lens sheet was used which had a thickness of 0.87 mm and a pitch of lenticular lenses of 0.22 mm. The ratio of the width of black stripes arranged equidistantly in the horizontal direction with respect to lenticular lenses (this ratio will be referred to as BS ratio hereinbelow) was 70%. A diffusion sheet joined to the lenticular lens sheet at the top portions of black stripes, as shown in FIG. 1, had a full-light transmissivity of a light beam incident from an uneven surface of 92% and a full-light transmissivity of a light beam incident from a flat surface of 68% (Tt2/Tt1=0.74). Table 1 shows the results obtained by measuring the horizontal diffusion characteristic, external light reflection brightness, and the presence of moiré in a transmission type screen composed of a combination of the lenticular lens sheet and diffusion sheet with a Fresnel lens sheet. Measurement results obtained in the below-described Comparative Examples 1~3 are also presented in Table 1. In Table 1, $\alpha$, $\beta$, and $\gamma$ in the horizontal diffusion characteristic denote the angles at which the gain is ½, ⅓, and ⅒, respectively. Furthermore, symbol ○ means that moiré is not observed and symbol X means that moiré is observed. As shown in Table 1, the transmission type screen of Embodiment 1 showed no moiré and demonstrated sufficient performance in terms of both the horizontal diffusion characteristic and contrast.

TABLE 1

| | Horizontal diffusion characteristic | | | External light reflection brightness | |
|---|---|---|---|---|---|
| | $\alpha$ (°) | $\beta$ (°) | $\gamma$ (°) | (nit) | moiré |
| Embodiment 1 | 45 | 51 | 63 | 6.5 | ○ |
| Comparative Example 1 | 44.6 | 49.5 | 61.2 | 31 | ○ |
| Comparative Example 2 | 12 | 12 | 12 | 3.4 | ○ |
| Comparative Example 3 | 39 | 48 | 63 | 4.4 | X |

Comparative Example 1

Comparative Example 1 is identical to Embodiment 1, except that the diffusion sheet with an uneven surface and the lenticular lens sheet were laminated without joining at the top portions of black stripes. In this case, moiré was not observed and the horizontal diffusion characteristic was sufficient. However, as shown in Table 1, the external light reflection brightness was high and contrast was insufficient.

Comparative Example 2

In Comparative Example 2, a transmission type screen was composed by combining the lenticular lens sheet and Fresnel lens sheet employed in Embodiment 1 (no diffusion sheet was used). In the transmission type screen of Comparative Example 2, which did not use a diffusion sheet, the horizontal diffusion characteristic was insufficient, as shown in Table 1.

Comparative Example 3

In Comparative Example 3, a transmission type screen was composed by combining a lenticular lens sheet having a thickness of 0.87 mm, a lenticular lens pitch of 0.72 mm, and a BS ratio of 45% and a Fresnel lens sheet. The screen was assembled with a conventional three-tube CRT. Since the transmission type screen had a large lens pitch of 0.72 mm, moiré was observed.

The present invention provides a transmission type screen which makes it possible to obtain an excellent horizontal diffusion characteristic, to eliminate moiré, and to increase contrast.

Reference Example

In Reference Example, 5 samples of the diffusion sheets, which are the Physical Optics Corporation's products, are measured the Tt2/Tt1, the gain, the horizontal diffusion characteristic, the vertical diffusion characteristic, the external light reflection brightness. Measurement results are presented in Table 2. In Table 2, the evaluations for the diffusion characteristic and the reflection brightness characteristic are also presented. In Table 2, symbol ○ means good and symbol Δ means not good but within allowed value. The values of the column between samples No. 1 and No. 2 are interpolation values calculated from the values of the samples No. 1 and No. 2.

TABLE 2

| No. | Part number | Tt2/Tt1 | Gain | Horizontal diffusion characteristic | | | Vertical diffusion characteristic | | | Evaluation for diffusion characteristic | External light reflection brightness (nit) | Evaluation for reflection brightness |
|---|---|---|---|---|---|---|---|---|---|---|---|---|
| | | | | $\alpha$ (°) | $\beta$ (°) | Y (°) | $\alpha$ (°) | $\beta$ (°) | Y (°) | | | |
| 1 | 10° PC10-10 | 90% | 18.4 | 11 | 14 | 29 | 11 | 14 | 20 | Δ | 1 | ○ |
| | — | 82% | 14.1 | 24 | 28 | 40 | 8 | 11 | 16 | ○ | 1.5 | ○ |
| 2 | 60° × 10° PC10-10 | 75% | 9.9 | 38 | 43 | 52 | 6 | 8 | 12 | ○ | 2 | ○ |
| 3 | 95° × 25° PC10-10 | 72% | 4.7 | 51 | 56 | 68 | 11 | 14 | 21 | ○ | 5.3 | ○ |
| 4 | 90° × 60° PC10-10 | 65% | 2.1 | 48 | 53 | 63 | 31 | 37 | 48 | ○ | 8.9 | ○ |
| 5 | 80° PC10-10 | 61% | 1.8 | 42 | 50 | 67 | 43 | 50 | 66 | ○ | 14.6 | Δ |

As shown in Table 2, diffusion sheet in which Tt1 and Tt2 satisfy the relationship 0.65<Tt2/Tt1<0.85 had a sufficient diffusion characteristic and a higher contrast was obtained. Further, more preferable range of the Tt2/Tt1 was from 0.7 to 0.8. Also, it was found that the diffusion angle was insufficient when the Tt2/Tt1 was the larger vale, and the external light reflection brightness increased and the contrast was reduced when the Tt2/Tt1 was the smaller vale.

In Table 2, sample Nos. 2, 3 and 4 were non-isotropic diffusion sheets. As shown from the data of the sample Nos. 3 and 4, by choosing the diffusion sheet which has a sufficient horizontal diffusion characteristic and a minimum vertical diffusion characteristic to need, it is possible to make Tt2/Tt1 small and reduce the external reflection brightness. Consequently, the non-isotropic diffusion sheets is preferable to be used in the transmission type screen according to the present invention.

While preferred embodiments of the present invention have been described using specific terms, such description is for illustrative purposes only, and it is to be understood that changes and variations may be made without departing from the spirit or scope of the following claims.

What is claimed is:

1. A transmission type screen comprising a Fresnel lens sheet, a lenticular lens sheet provided with convex black stripes on the light-exit surface, and a diffusion sheet having an uneven surface on one side thereof, wherein the uneven surface of said diffusion sheet is joined to the lenticular lens sheet at the top portions of black stripes.

2. The transmission type screen according to claim 1, wherein Tt1 and Tt2 satisfy the following Formula (1)

$$0.6 < Tt2/Tt1 < 0.98 \tag{1}$$

where Tt1 (%) stands for a full-light transmissivity at the time when a light beam is incident onto the diffusion sheet from the uneven surface and Tt2 (%) stands for a full-light transmissivity at the time when a light beam is incident from the surface opposite to said uneven surface.

3. The transmission type screen according to claim 1 or 2, wherein the pitch of lenticular lenses on the light incidence side which are arranged equidistantly in the horizontal direction on the lenticular lens sheet is less than 0.5 mm.

4. The transmission type screen according to claim 1 or 2, wherein the maximum distance from the lens surface on the light incidence side of the lenticular lens sheet to the light-exit surface is larger than 0.3 mm.

5. The transmission type screen according to claim 1 or 2, wherein Lt and Lf satisfy the following Formula (2)

$$0.8 < Lf/Lt < 1.2 \tag{2}$$

where Lt (mm) stands for a maximum distance from the lens surface on the light incidence side of the lenticular lens sheet to the light-exit surface and Lf (mm) stands for a focal distance of lenses on the light incidence side of the lenticular lens sheet.

6. The transmission type screen according to claim 1 or 2, wherein the diffusion sheet is subjected to coloration treatment so that the diffusion sheet absorbs light.

7. The transmission type screen according to claim 6, wherein the coloration treatment is conducted only on the uneven surface.

8. The transmission type screen according to claim 1 or 2, wherein the diffusion sheet has non-isotropy.

9. The transmission type screen according to claim 1 or 2, wherein the lenticular lens sheet and the diffusion sheet are curved to project the center of the light-entering side of the diffusion sheet.

* * * * *